(12) United States Patent
Appa

(10) Patent No.: US 6,492,743 B1
(45) Date of Patent: Dec. 10, 2002

(54) JET ASSISTED HYBRID WIND TURBINE SYSTEM

(76) Inventor: Kari Appa, 22242 Anthony Dr., Lake Forest, CA (US) 92630

( * ) Notice: Subject to any disclaimer, the term of this patent is extended or adjusted under 35 U.S.C. 154(b) by 15 days.

(21) Appl. No.: 09/894,345

(22) Filed: Jun. 28, 2001

(51) Int. Cl.[7] ................................................. F03D 9/00
(52) U.S. Cl. ............................ 290/55; 290/44; 416/147
(58) Field of Search .............................. 290/43, 44, 54, 290/55; 416/147, 159

(56) References Cited

U.S. PATENT DOCUMENTS

| | | | | |
|---|---|---|---|---|
| 4,039,848 A | * | 8/1977 | Winderl ........................ | 290/55 |
| 4,256,435 A | * | 3/1981 | Eckel ...................... | 415/209.1 |
| 5,140,856 A | * | 8/1992 | Larsen ........................ | 416/144 |
| 5,281,094 A | * | 1/1994 | McCarty et al. ............ | 318/722 |
| 5,664,418 A | * | 9/1997 | Walters ........................ | 290/53 |
| 6,127,739 A | * | 10/2000 | Appa ............................ | 290/42 |
| 6,278,197 B1 | * | 8/2001 | Appa .......................... | 290/54 |

* cited by examiner

Primary Examiner—Nicholas Ponomarenko

(57) ABSTRACT

Hybrid wind turbine apparatus includes a pair of counter rotating rotors having micro thrusters fitted at tip of each blade of the rotors. An upright mast supports bearings underlying and rotatably supporting a hub assembly having tandemly mounted dual alternators. A first set of rotor is mounted on the windward alternator shaft, while the second rotor is mounted on the downwind rotor shaft. A heat exchanger having a centrifugal fan is provided to circulate ambient air to cool alternator. The hot air is directed to the combustion chamber of the thruster by means of an air duct in the blades. Natural gas or liquid fuel is also conveyed from a stationary platform to a rotating frame by means of a rotary fluid coupler. When wind speed is low, fuel will be injected into the combustion chamber and burned with large mass of air. The hot gas is expanded in an exist nozzle to provide thrust to assist wind power. Thus, the hybrid wind turbine system can become beneficial without the need for an auxiliary system during low wind season.

10 Claims, 10 Drawing Sheets

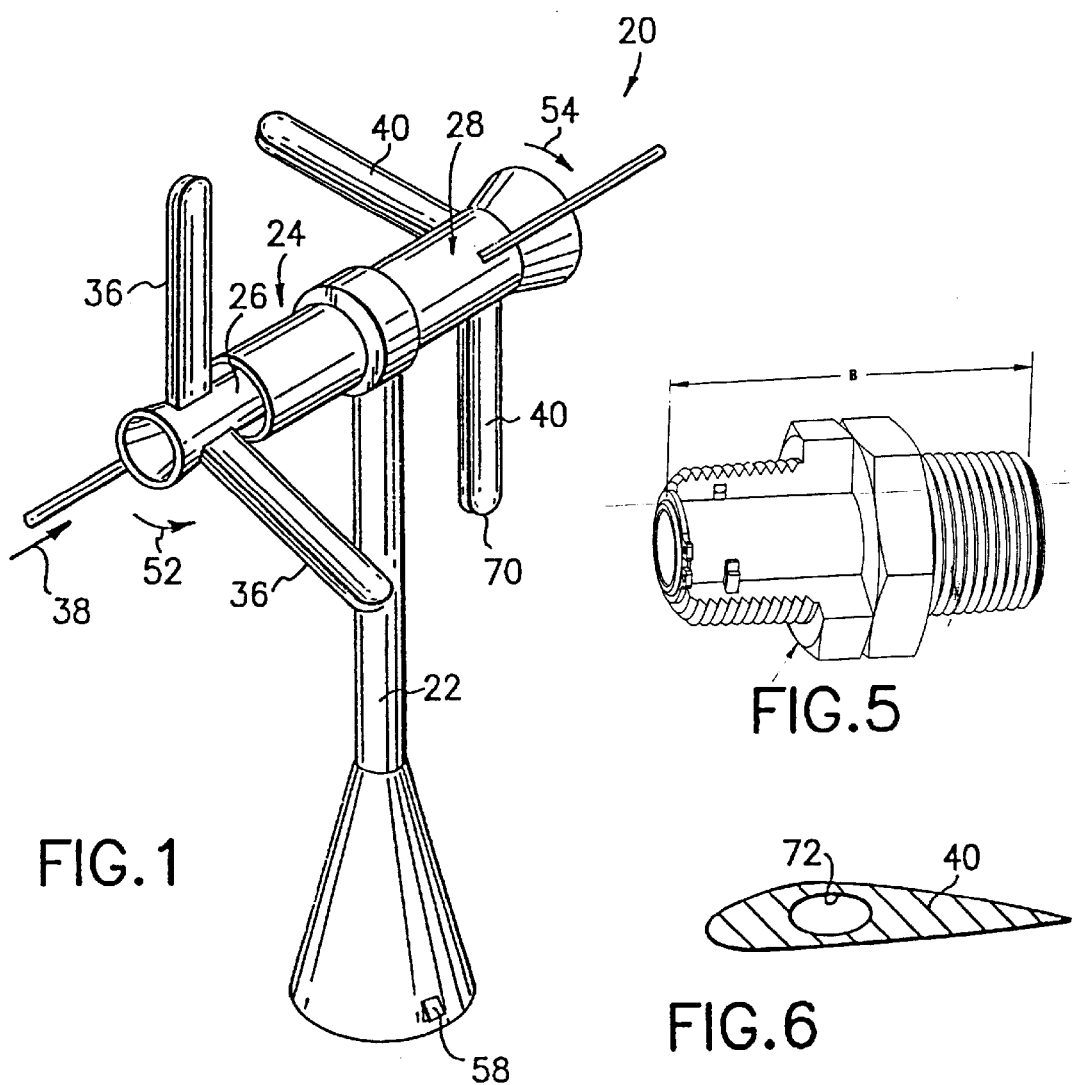
FIG. 1
FIG. 5
FIG. 6
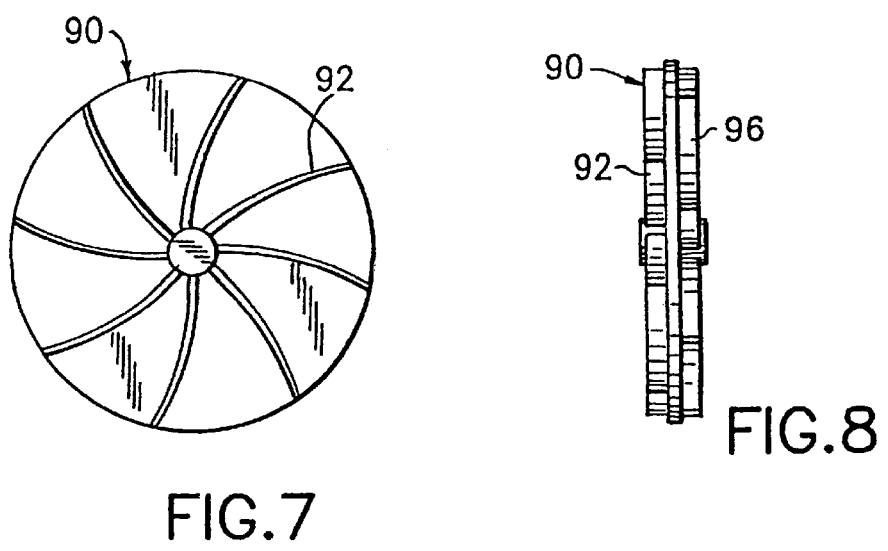
FIG. 7
FIG. 8

JET ASSISTED HYBRID WIND TURBINE SYSTEM

BACKGROUND OF THE INVENTION

1. Field of the Invention

The present invention relates generally to a wind energy conversion system and, more particularly, to the design and manufacture of a hybrid wind turbine system that can be designed to provide certain level of power during low wind speed seasons. The hybrid system uses the assistance of jet thrusters powered by liquid fuel or natural gas in a very economical manner with low investment.

2. Description of Prior Art

In recent years, wind energy projects have included the installation of large numbers of wind turbine generating systems at locations having favorable wind conditions. But, the practical turbines are not producing the amount of wind energy that was projected. There are many reasons for this shortfall of wind energy. Little can be done about the wind itself, with the exception of understanding the available resource better by using direct measurement and analysis. However, a new hybrid rotor system according to the present invention, designed to take better advantage of the available wind resource, provides an opportunity for a significant increase of energy production.

Albert Betz, a German engineer showed that the maximum energy that can be converted to electrical/mechanical energy in a stream of wind is less than 59%. But, a practical wind turbine, according to Paul Gipe, can only deliver less than 20% of the available power. The reason for such significantly low energy conversion efficiency may be attributed to the downstream velocity ($V_2$) behind a single rotor being greater than one third of the upstream velocity ($V_1$). Furthermore, according to C. G. Curtis, who is known for "Curtis Stage Velocity Compounding" in steam turbine design, it is well known that a single stage wind rotor system cannot possibly extract the amount of power estimated by Betz.

A few patents are typical of the known prior art attempting to improve on earlier efforts to harness wind energy. For example, U.S. Pat. No. 5,456,579 to Olson discloses a wind turbine blade with a governor to maintain optimum rotational speed. The governor positions an aileron for varying wind speed and includes a lead weight positioned at the wing tip and connected to a mechanism that deploys the aileron to achieve the maximum lift to drag ratio at all wind speeds. U.S. Pat. No. 5,419,683 to Peace discloses a method of installing a plurality of wind turbines on chimneys, towers or the like. Two rotors having their horizontal axes are mounted back to back on a ring that turns about the chimney. The primary concept of this invention is to utilize existing structures to mount a plurality of wind turbines and to eliminate the need for wind farms. U.S. Pat. No. 4,976,587 to Johnston et al. discloses a method for manufacturing composite blades having highly improved aerodynamic efficiency. The blades employ the NASA airfoil section LS(1)-04XX having 29 per cent thickness at 3/10 radius and 18 per cent at the blade tip. The airfoil section comprises two spars, which terminate into a circular section at the hub. U.S. Pat. No. 4,648,801 to Wilson discloses a method of compressing air by means of a wind turbine. The air is drawn from the low energy region of the downwind stream. The compressed air is connected to the intake of a prime mover (such as a diesel engine, a gasoline engine, or a gas turbine) to boost its output power and drives an alternator. U.S. Pat. No. 6,127,739 issued to Appa discloses a jet assisted counter rotating wind turbine system designed to enhance power conversion efficiency utilizing blade tip mounted jet thrusters and counter rotation of tandem rotors. U.S. Pat. No. 5,660,038 issued to Joseph Walter Stone discloses a power generating Rotary Jet Engine that uses at least one combustion jet mounted on a circular disk. U.S. Pat. Nos. 6,223,521 and 6,233,918 issued to Shawn P. Lawlor disclose a method of power generation by means of a Ramjet Engine similar to that of U.S. Pat. No. 5,660,038. It was with knowledge of the foregoing state of the technology that the present invention has been conceived and is now reduced to practice.

SUMMARY OF THE INVENTION

The present invention describes a method of designing and manufacturing a hybrid wind turbine apparatus, which can provide certain level of power even when wind speed is as low as cut-in speed without requiring any auxiliary units. Said apparatus comprises:

1. a pair of counter rotating rotors having their blade angles set to rotate in opposite directions,
2. a pair of electrical power generating alternators placed in tandem and having their rotating magnetic field drums directly connected to said counter rotating rotors,
3. plurality of air breathing micro thrusters having one unit fitted to each blade tip in a sense to assist aerodynamic torque when needed,
4. a rotary fluid coupler to transfer natural gas or liquid fuel from a stationary platform to a rotating platform in a radial direction along a duct in each of the rotor blades,
5. a heat exchanger fitted with a centrifugal fan to cool the armature using incoming ambient air, and direct the hot air to the blade tip passing through ducts provided in each blade,
6. plurality of battery packs fitted to each blade and powered by plurality of solar cells fitted on to the surface of the blade near the tip sections,
7. plurality of gas sensors and igniters to sense incoming fuel and ignite fuel and air mixture,
8. a mast to support the wind turbine assembly and having a yaw bearing to align the rotors into the wind direction.

Wind turbines are designed to generate rated power at an average wind speed in a specific site. When the wind speed is far below the rated speed energy production will be negligible, since power varies as cube of the wind speed. For example, if the wind speed is half of the design speed, then the electrical power production will be $1/8^{th}$ of the rated power. To supplement the loss of power, auxiliary power generating units such as gas turbine generators are required. This amounts to additional investment. And moreover operating cost will be high since gas turbines are less efficient. To circumvent the deficiencies of season dependent wind turbines, the present innovation suggests the use of inexpensive air breathing thrusters mounted at the tip of rotor blades to assist wind turbines when needed. A thruster may belong to any of the following class of air breathing engines such as micro gas turbines, rockets, ramjets, pulsejets or a combination of any of these devices. In essence a thruster must be mechanically simple, inexpensive to manufacture and maintain. Again, these must be able to use natural gas or any inexpensive fuel source to power these thrusters. The aerodynamic torque balances the rotor drag and mechanical friction whenever the wind speed is higher than the cut-in speed. Hence, any thrust imposed in the direction of the rotor rotation will do a useful work and generate electrical power at reduced cost of fuel used by the thruster.

Furthermore as discussed in the previous section, a single stage rotor system can not convert physically possible amount of wind power into electrical power. Therefore, the proposed invention suggests another improvement, a two-stage rotor device that is set to rotate in opposite directions. There are two ways to incorporate the counter rotating system. One approach is to use a single alternator, in which one rotor drives an armature, while the other rotor drives a drum of magnetic field having plurality of pole pairs. Thus, the magnetic flux rate in the air gap will be doubled resulting in higher voltage at lower rotational speed. The present inventor has already disclosed this approach in the U.S. Pat. No. 6,127,739.

Now we turn to an alternate approach, which comprises two sets of wind turbine units mounted in tandem such that their rotors rotate in opposite directions. In a counter rotating system the net torque is practically zero, if both machines produce same power. Hence it is possible and economical to upgrade existing wind machines using the same towers.

In essence, the proposed hybrid wind turbine device involves three distinct innovations. In a first instance, the turbine design of the invention comprises a pair of counter rotating rotors that are directly mounted on the generator units without using any mechanical gearing devices. Consequently, this reduces total weight of the system, initial unit cost and maintenance cost. More importantly, a dual rotor system is believed to extract substantially increased amount of power from the wind, and doubles the electrical voltage output resulting in reduced copper losses and cost.

In a second instance, thruster assisted hybrid power generating device reduces initial capital cost of power in terms of dollar per kilowatt. Because, thrusters are very inexpensive to manufacture unlike gas turbines and use inexpensive fuel, and drive the same electrical generator without the need for auxiliary units. Thus, the thrusters a complement the wind power when needed. Consequently, a community will be assured of certain level of electrical power at all seasons at low capital investment.

In a third instance, as another feature of the present invention is a method of recycling kinetic and thermal energies to produce electrical power. This includes utilization of dynamic compression of ambient air through an inlet, further compounding pressure build up through a compressor or a centrifugal fan and capturing thermal energy while cooling the armature in a heat exchanger. Alternators at full load produce heat resulting from iron and copper ($I^2R$) loses. This loss generally amounts to about 10 to 15% of generated power. To recycle this heat a heat exchanger will be used. The present invention proposes to use ambient air as the cooling medium in the heat exchanger. The hot air after passing through the heat exchanger is diverted through an air duct in the blade, where it is compressed due to centrifugal acceleration and finally injected into the combustion chamber of the thruster. In the combustion chamber it mixes with incoming ram air and the fuel. The mixed gas is burnt in the combustion chamber and expanded through an expansion nozzle to produce thrust. Thus, the kinetic energy of the incoming air and the thermal energy of the armature is transformed into electrical energy.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms.

BRIEF DESCRIPTION OF THE DRAWINGS

The foregoing aspects and other features of the present invention are explained in the following description, taken in connection with the accompanying drawings, wherein:

1. TITLE OF THE DRAWINGS

Figure 2:
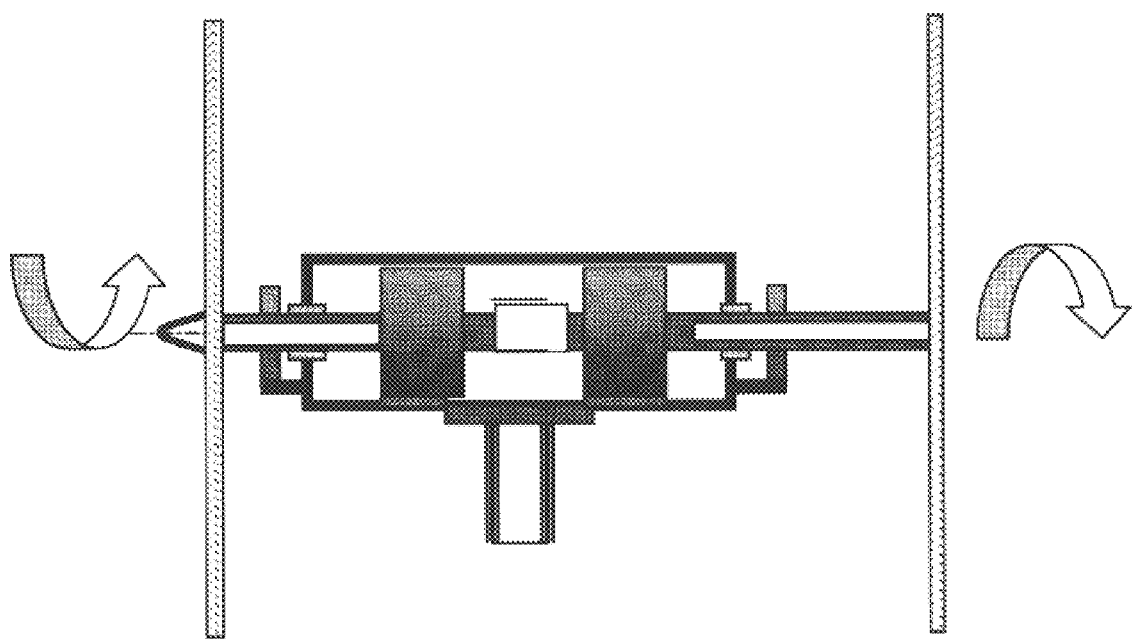
Figure 3:
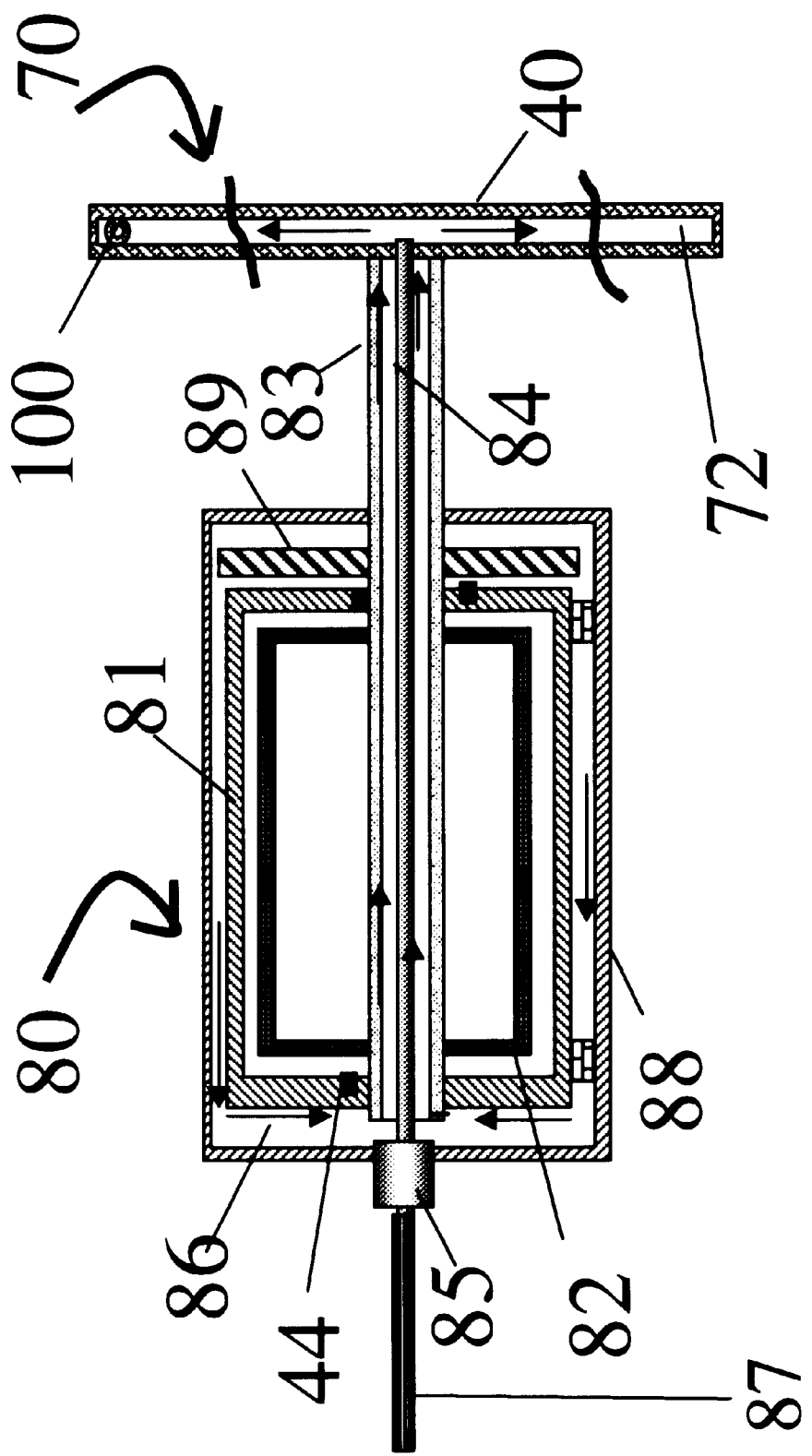
Figure 4:
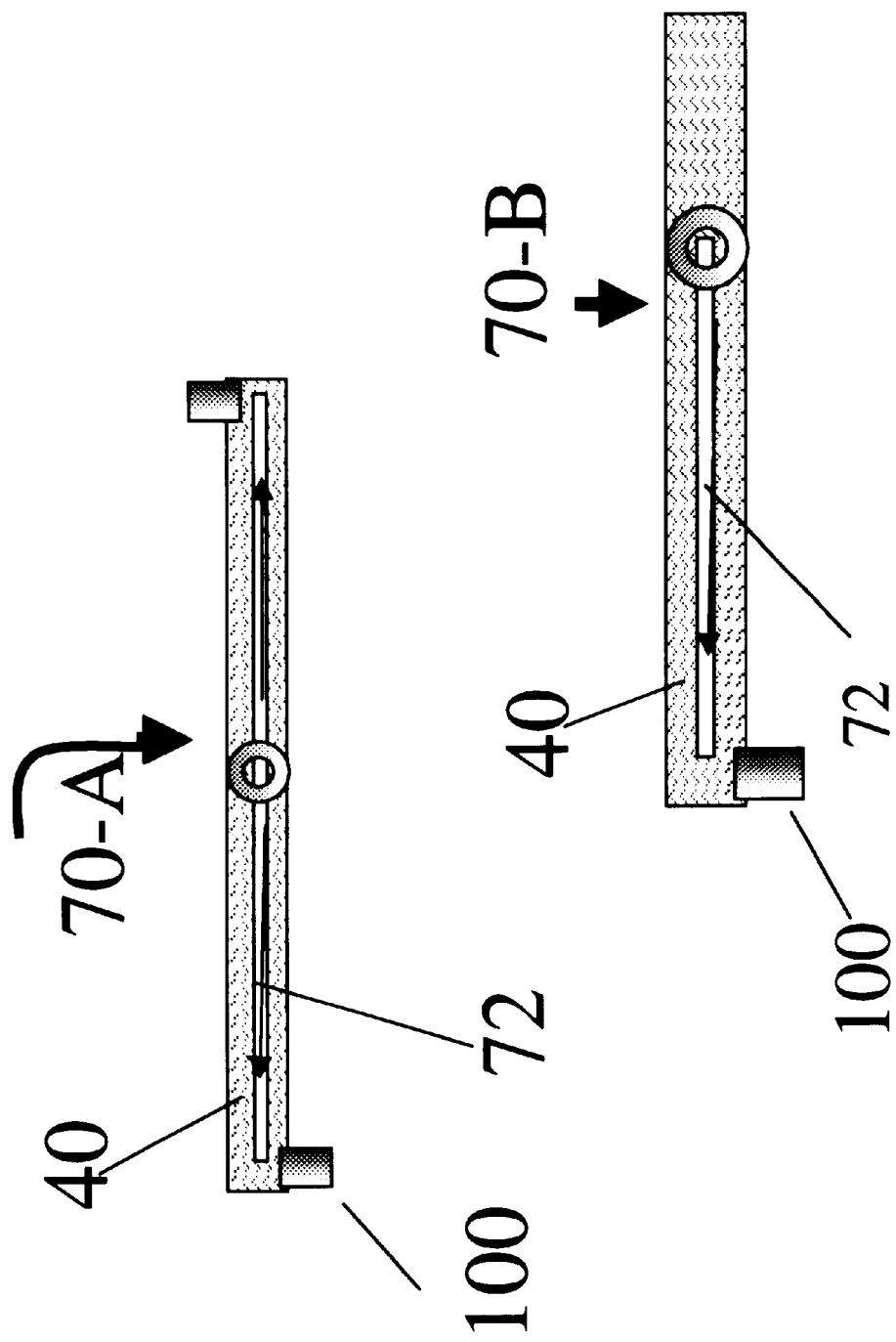
Figure 9:
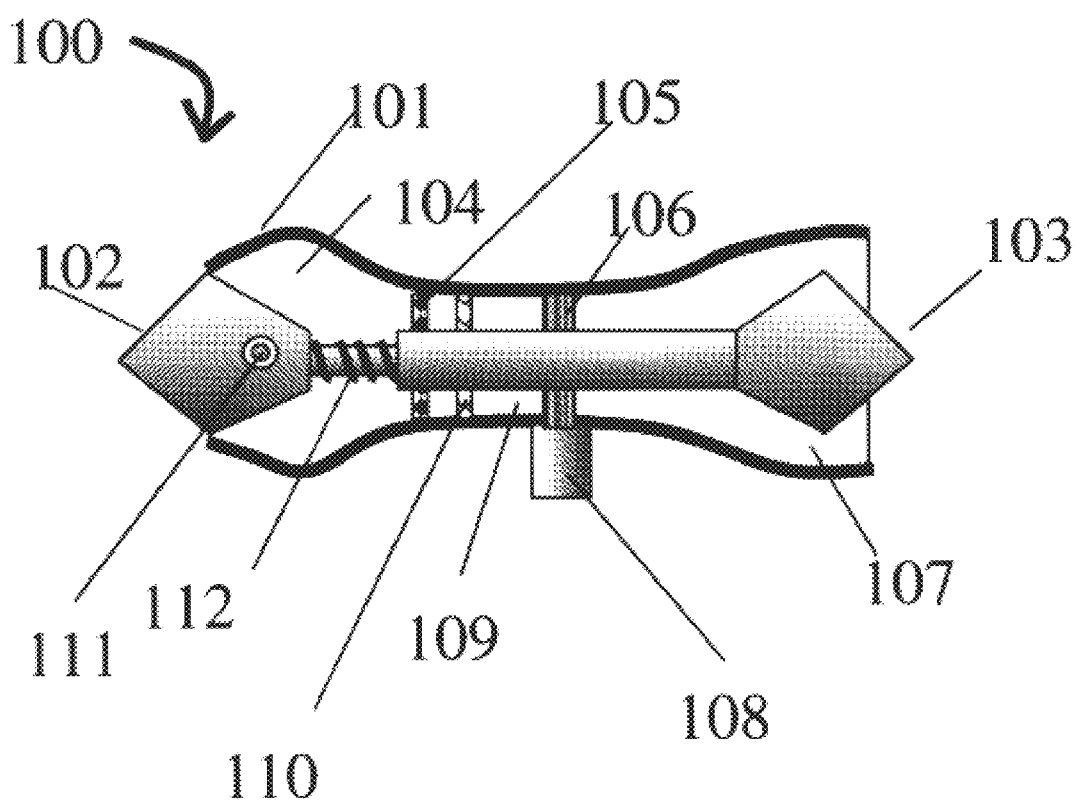
Figure 10:
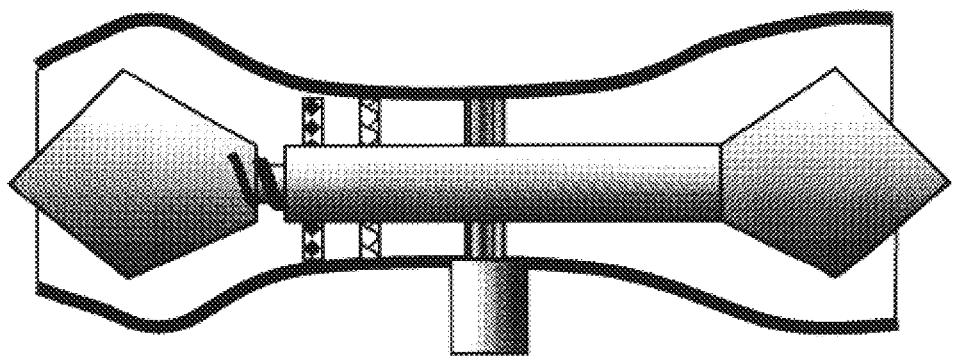
Figure 11:
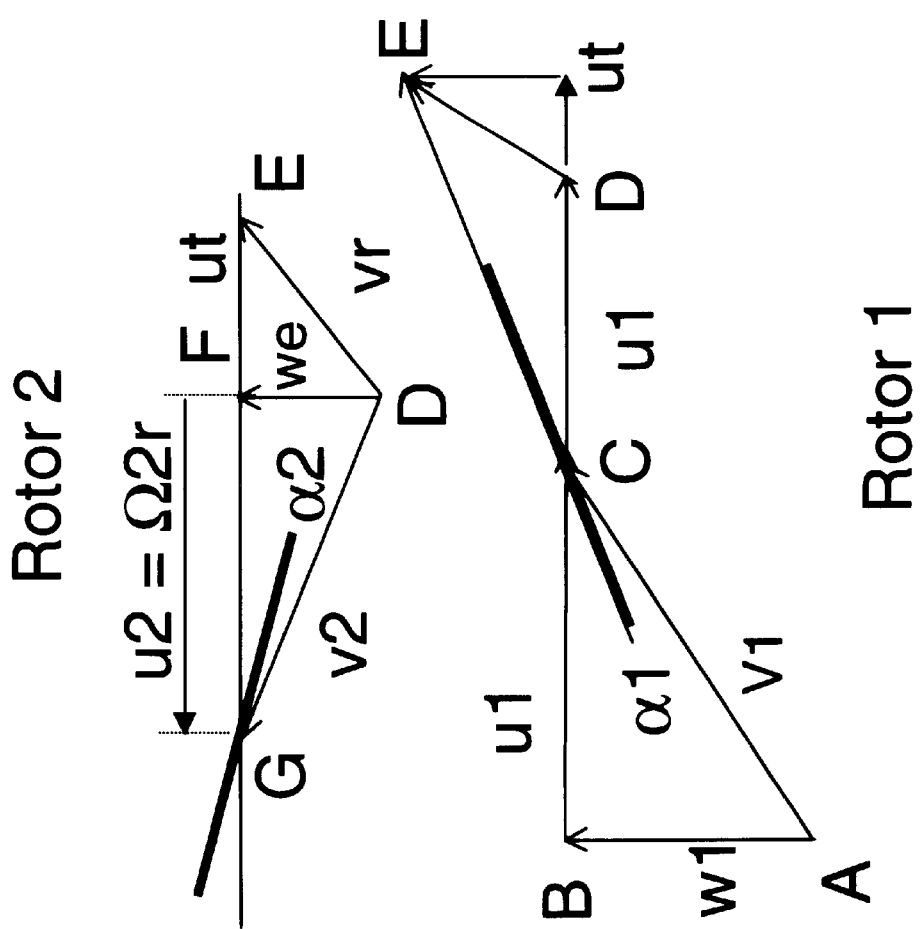
Figure 12:
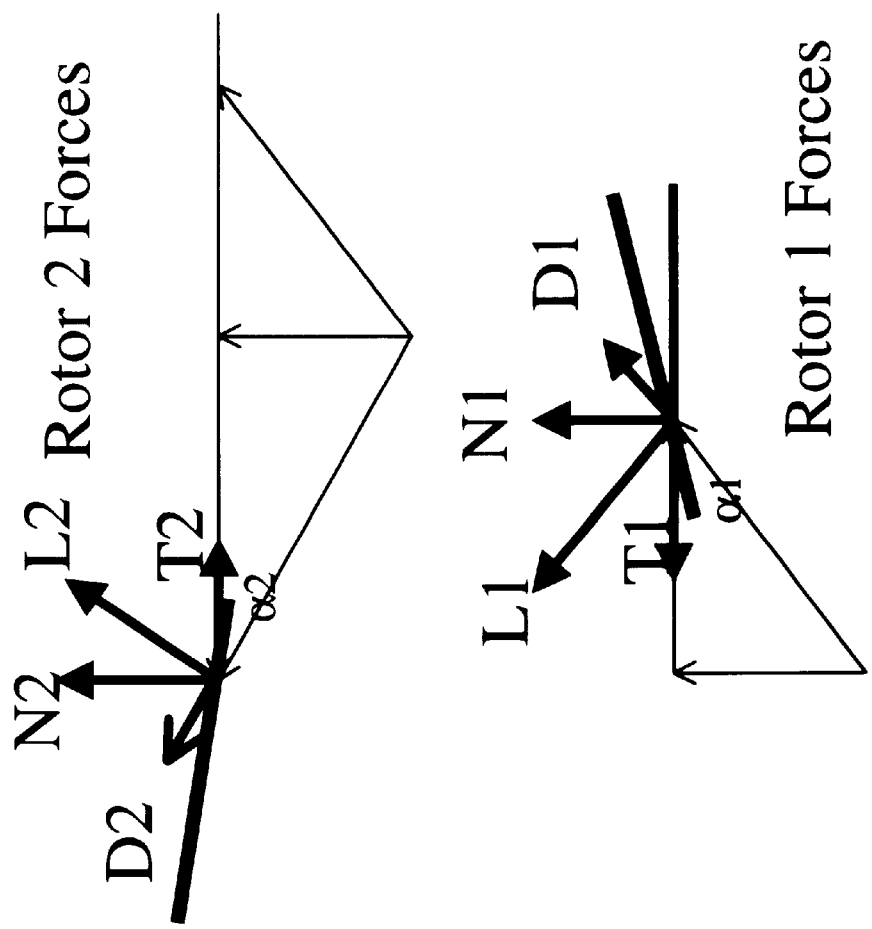
Figure 13:
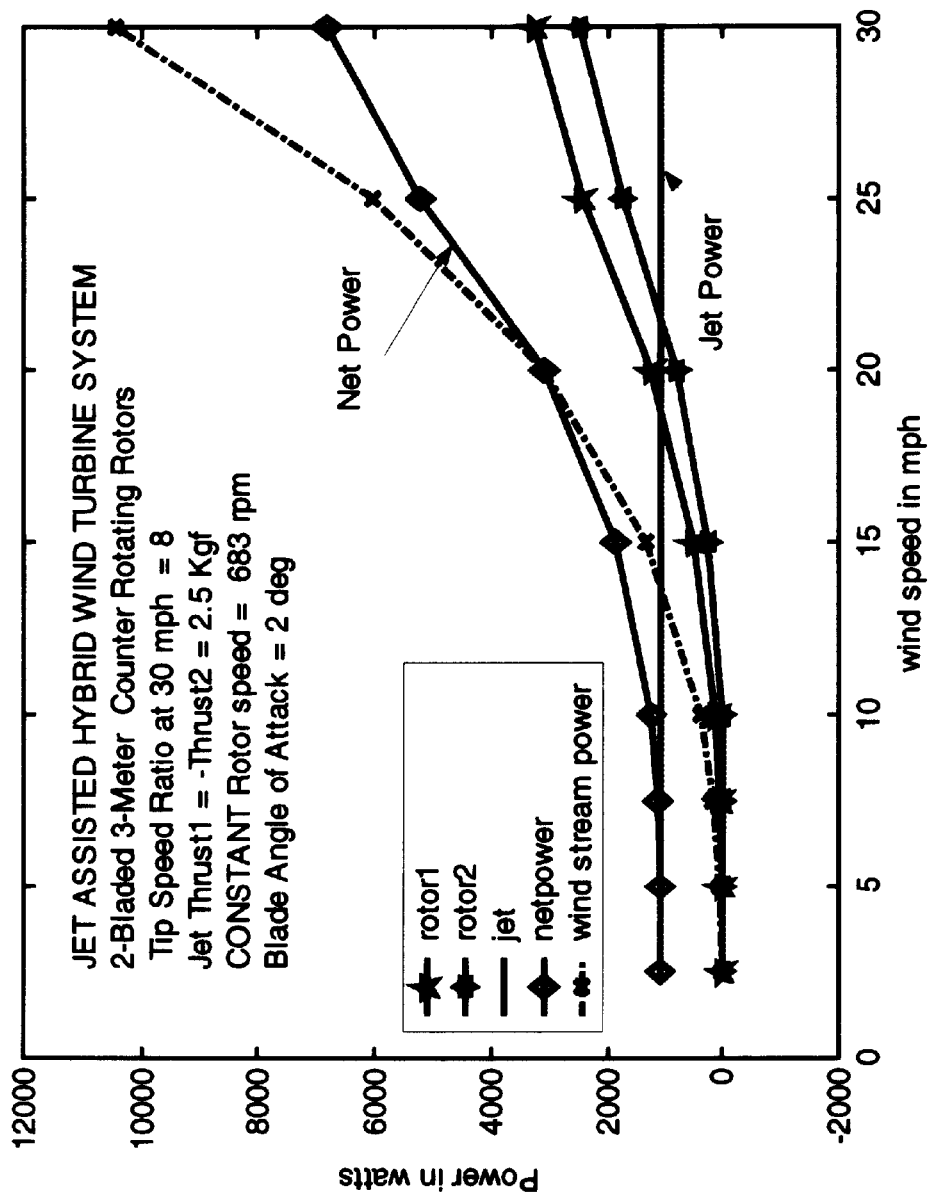

FIG. 1 is a perspective view of a counter rotating hybrid wind turbine system embodying the present invention;

FIG. 2 is an interior view of two wind turbine units mounted in tandem and set to rotate in opposite directions, FIG. 3 is a direct drive wind turbine device showing its primary components, FIG. 4 is a typical configuration of a rotor; 70-A is two bladed rotor assembly fitted with micro thrust engines, 70-B is single bladed rotor assembly fitted with a micro thrust engine FIG. 5 is a rotary coupler that helps to convey fuel from a stationary platform to a rotating platform, FIG. 6 is an airfoil cross section of a blade showing an air duct and fuel conduit, FIG. 7 is the front view of a double-sided centrifugal fan disc, FIG. 8 is the side view of the centrifugal Fan disc, FIG. 9 is an overview of a thruster with inlet closed at low rotational speed, FIG. 10 is an overview of a thruster with inlet open at high rotational speed, FIG. 11 shows the velocity vector diagram of rotor 1 and rotor 2, FIG. 12 shows the force vector diagram of two rotors, FIG. 13 is a power performance chart of a Grid Connected hybrid wind turbine system.

Figure 14:
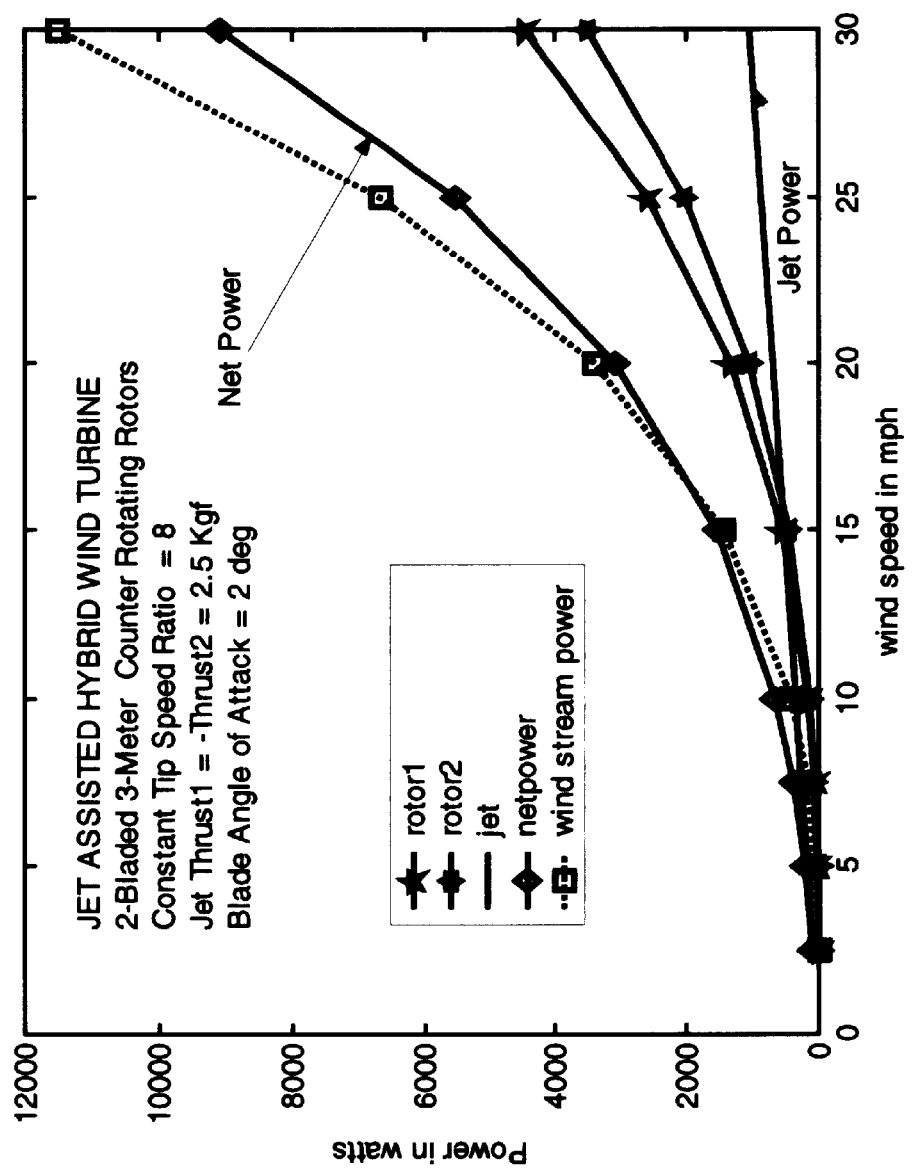

FIG. 14 is a power performance chart of a Non-Grid Connected hybrid wind turbine system.

2. REFERENCE NUMERALS 20 perspective view of hybrid wind turbine system
22 mast
24 rotatably mounting bearing assembly
26 windward rotor shaft
28 leeward rotor shaft
36 windward rotor blade
38 wind direction
40 leeward rotor blade
44 hallow shaft bearing
52 windward rotor direction of rotation
54 leeward rotor direction of rotation
58 power out let point
70 rotor assembly
72 air passage duct in wind turbine blades
80 alternator assembly
81 armature shell
82 magnet rotor drum
83 hallow shaft
84 fuel conduit in a rotating frame
85 fluid rotary coupler 86 air passe in heat exchanger
87 fuel line on a stationary platform
88 heat exchanger enclosure
89 centrifugal fan disc
100 micro thruster
101 thruster outer body
102 fore-cone of center body
103 aft-cone of center body
104 diffuser section
105 fuel injection holder
106 center body support structure, including passage for air and fuel
107 exhaust nozzle section
108 thruster attachment coupler to the air duct at blade tip
109 combustion chamber
110 flame holder

DETAILED DESCRIPTION OF THE PREFERRED EMBODIMENT

Referring to FIG. 1, there is shown a perspective view of a hybrid wind turbine system 20 incorporating features of the present invention. Although the present invention will be described with reference to the single embodiment shown in the drawings, it should be understood that the present invention could be embodied in many alternate forms of embodiments. In addition, any suitable size, shape or type of elements or materials could be used.

In FIG. 1, said wind turbine device is seen to include two rotor assemblies 70, an upright mast 22 supporting a hub assembly 24 including front and rare rotor shafts 26, 28, respectively. The leeward (downwind) rotor blades 40 are generally longer than the upwind rotor blades 36 to compensate for certain amount of wind energy lost in the wake of the first rotor. An arrow 38 denotes the wind direction and also air inlet to the centrifugal fan 89 (see FIG. 3), while arrows 52 and 54 denote front and rare rotor rotational directions, respectively. Each rotor blade tip can be fitted with micro thrusters 100 (see FIGS. 4, 9 and 10) appropriately positioned in the favorable direction of rotation. The electrical power as it is generated will be transmitted to a distant receiver 58, which may be within said upright mast, and beyond. FIG. 2 shows a tandem assembly of two alternators, and is seen to be simpler to upgrade existing wind turbines using commercially available units and thereby increase power production.

In FIG. 3, an alternator 80 is seen to include a stationary armature shell 81 fitted with plurality of wound copper wire coils, and a rotating magnetic drum 82 having plurality of magnetic circuits. Said magnetic drum is firmly fixed to a rotating hallow shaft 83. Said hallow shaft in turn is rotatably mounted on two bearings 44, fixed to sidewalls of said armature shell. A heat exchanger 88 is provided to cool said armature. Said centrifugal fan is rotatably mounted on said hallow shaft to circulate cold air drawn from outside of said alternator. FIGS. 7 and 8 show two views of fan disc 90 having convoluted blades 92 and 96. The outward-facing blades draw ambient cold air, while inward-facing blades circulate air through air passage 86 found in said heat exchanger. In this process, the incoming air, first experiences ram compression, and then centrifugal compression. Further, heat is exchanged from the armature to the air. Thus, the energy level of the ambient air is compounded in three levels. Next, the hot air is directed to an air duct 72 in the blade (see FIGS. 4 and 6) passing through said hallow shaft. While said blades spin about an axis of rotation, the column of air mass in each of said blades experiences an additional centrifugal head, $$h = \frac{(\omega \cdot R)^2}{2g},$$

where $\omega$ is the angular velocity of the rotor in radians per second and R is the radial distance from the axis of rotation. Thus, the kinetic energy of wind, the thermal energy of armature resulting from copper and iron losses, and the centrifugal head are compounded to increase the pressure of the ambient air mass as it reaches the thruster inlet located at blade tip. Finally, the high-energy air enters the thruster unit 100 (see FIG. 4). A rotary fluid coupler 85 (see FIG. 5) connects a stationary fuel line 87 to a rotating fuel conduit 84 that is centrally positioned in a rotating hallow shaft.

FIG. 4 shows a typical assembly of an aerodynamic energy converting means, wind rotor 70 that generally comprise of single blade, two or three blades evenly spaced around an axis of rotation. A single bladed configuration having a counter weight could be used to generate electrical energy in low wind speed sites. According to the present innovation, natural gas powered micro jet thrusters could be fitted at tip of each blade to provide additional torque during low wind season. Compressed air and fuel conveying means are provided through said air ducts shown within each blade for the operation of said thruster.

FIGS. 9 and 10 show two operating configurations of said thruster. At low rotor speed conditions, the ram pressure is less than the combustion pressure; hence the thruster inlet remains closed as shown in FIG. 9. Whereas at high rotor speed conditions, the ram pressure will be sufficiently high to compress retainer spring 112 and allows the ram air to enter the diffuser 104, as seen in FIG. 10. Referring to FIG. 9, said thruster is seen to include; an outer body 101, a forebody cone 102, an aftbody cone 103, a supporting frame 106 having double-arc shaped cross section in the direction of flow, a fuel injector frame 105, and a flame holder 110. Said forebody cone is slidably assembled and positioned longitudinally by said spring. An attachment coupler 108 is provided to join said supporting frame to said blade air duct. Said attachment coupler also provides communicating passage means for air, fuel and electrical source. In addition, high-energy air that circulated through said heat exchanger will be injected into the combustion chamber 109 at plurality of air outlets 111. Similarly, fuel is also conveyed to said injectors and sprayed into said combustion chamber.

An automated electrical igniter will be provided to sense the incoming fuel and create a spark to ignite the fuel in the combustion chamber. A solar cell powered battery pack will be installed near the blade tip region and used as the source of electrical power to sense incoming fuel and ignite. Finally burnt gas and air expands through an exhaust nozzle 107 providing propelling thrust. It may further be possible to control the rate of fuel input depending on wind speed and power demand. This concludes the working principle of a hybrid wind turbine system that requires no other auxiliary units to support the power requirement of a community during low wind seasons.

Let us now consider the theoretical aspects of the invention. To this end, consider the two-rotor configuration shown in FIG. 1, in which each blade is provided with a jet thruster. A utility scale wind turbine is generally connected to a power grid system. Then, the rotor speed will be held constant in relation to main grid frequency and number of magnetic circuits in the magnet drum. However, the rotor speed, in case of a distributed power supply system, varies with the wind speed.

To better understand the reason for selecting the hybrid wind turbine system, we will review first the mathematical background followed by two examples of thruster assisted wind turbine innovation.

Velocity Vector Diagram

Let us consider two blade sections in the planes of rotors as shown in FIG. 11. The blades of these rotors are set to rotate in opposite directions.

For the windward rotor 1,

AB denotes the wind speed, $w_1$,

BC the tangential rotor speed, $u_1$, and

AC the relative velocity, $v_1$.

The blade angle of incidence is set at $\alpha_1$. If friction losses are neglected the flow leaves the trailing edge with an exit velocity $v_1$. However, the global exit velocity $v_r$ is denoted by DE, having a tangential (swirl) component, $u_r$, and an exit wind velocity, $w_e$.

For the downwind (leeward) rotor,

DE denotes the on-set wind speed, $v_r$,

EG the tangential velocity, $u_2$ and

DG the relative velocity, $v_2$.

It is intriguing to note that if the angular velocities of rotor 1 and rotor 2 are equal and opposite, i. e. $\omega_2 = -\omega_1$, the relative velocity $v_2$ is almost (since $\alpha_1$ is small) equal to $v_1$, and consequently the torque of rotor 1 and rotor 2 balance each other. Hence, the supporting structure need be designed primarily for thrust load.

Force Vector Diagram and Power Output

FIG. 12 shows the force diagram of two counter rotating rotors, in which $L_1$, $D_1$ and $L_2$, $D_2$ denote lift and drag forces of rotors 1 and 2, respectively. On resolving these forces along normal and tangential directions the thrust and tangential forces for each rotor are denoted by $N_1$, $T_1$ and $N_2$, $T_2$ respectively.

Torque per unit strip, dS of each rotor blade is given by $$d\tau_1 = \frac{1}{2} \rho w^2 \sqrt{(1 + t_1^2 \xi^2)} \, [C_L - C_D t_1 \xi] dSr \qquad (1)$$

$$d\tau_2 = -\frac{1}{2} \rho w^2 \sqrt{(1 + (\Delta t \xi)^2)} \, [C_L - C_D \Delta t \xi] dSr \qquad (2)$$

Power per unit strip dS is given by $$dP_1 = \frac{1}{2} \rho w^3 t_1 \xi \sqrt{(1 + t_1^2 \xi^2)} \, [C_L - C_D t_1 \xi] dS \qquad (3)$$

$$dP_2 = -\frac{1}{2} \rho w^3 t_2 \xi \sqrt{(1 + (\Delta t \xi)^2)} \, [C_L - C_D \Delta t \xi] dS \qquad (4)$$

in which dS=$C_r$ dr area of the blade strip $$t_1 = \frac{\Omega_1 R}{w_1} \quad \text{rotor 1 tip speed ratio} \qquad (5)$$

$$t_2 = \frac{\Omega_2 R}{w_e} \quad \text{rotor 2 tip speed ratio} \qquad (6)$$

$$\xi = r/R \qquad (7)$$

$$\Delta t = t_1 + t_2 \qquad (8)$$

The power in the wind stream is given by $$dP_w = \frac{1}{2} \rho w^3 (2\pi r dr) \qquad (9)$$

Next, integrating torque along the span of N blades, the total torque including the contribution from the tip mounted jet thruster is given by, $$\tau = N(\int d\tau_1 + \int d\tau_2 + F_j R) \qquad (10)$$

where, $$F_j = qV_e \qquad (11)$$

is the jet thrust in the plane of rotor rotation in which q is the fuel mass flow rate per second and $V_e$ is the jet exist velocity. Finally, the net power of the hybrid system is given by, $$P = \tau \cdot \omega \qquad (12)$$

and $\omega$ is the rotor angular velocity in radians per second.

We consider two examples that demonstrate the merits of the hybrid wind turbine system. Here, we select two 3-meter diameter rotors that are set to rotate in opposite directions. Each rotor consists of two blades, and each blade is fitted with micro thrusters, which produce 2.5 kilogram thrust force. Betz power factor, $C_p$=0.59 is used to calculate air stream induced power. In addition 80 per cent mechanical efficiency of the system has been assumed. Two test cases were exercised.

Case 1: Grid Connected Wind Turbine with Constant Rotor Speed

This example represents a grid connected wind turbine, in which the rotor speed was fixed at 683 revolutions per minute (rpm) at all wind speeds. Rotor setting was matched to extract available wind stream power. At cut-in wind speed wind generated torque is just sufficient to overcome mechanical friction and aerodynamic drag forces of the rotor. The jet generated thrust is then fully (100 per cent) effective in producing electric power. FIG. 13 shows power generated from rotors 1, 2 and the jet at various wind speeds in miles per hour (mph). The net power at low wind speeds is significantly higher than that available in the wind stream. Even at higher wind speeds, generated net power amounts to nearly 75 per cent of wind power. Thus, it is seen even at low wind speeds a mere 2.5 kilogram thrust produces 800 watts of power.

Case 2: Non-Grid Connected Wind Turbine wit Constant Tip Speed Ratio

This example represents non-grid connected wind turbine system, in which the rotor speed varies with the wind speed maintaining constant tip speed ratio of 8. FIG. 14 shows the power curves for different combination of the wind turbine system. In this case the jet thrust generated power varies with wind speed since the rotor speed increases with wind speed. It is intriguing to note that the net power is almost close to the wind stream power at low speeds, and produces close to 80 per cent that of wind stream power at 30 miles per hour wind.

These two examples demonstrate that micro thrusters in wind speeds above cut-in speed is extremely efficient and hence can-be recommended as a economical hybrid wind turbine system. From all of the foregoing, consider some of the advantages of the proposed wind turbine system over the known single rotor system:

1. these innovations disclosed are expected to increase the energy conversion efficiency by 80 to 90 per cent compared to the conventional wind turbines of similar rotor disk area;

2. improved energy conversion efficiency leads to light weight turbine system, easy to install and maintain, with reduced acquisition cost and annual energy cost;

3. proposed jet assisted hybrid system permits installation of renewable energy units embodying the invention for irrigation, schools, hospitals and hotels in many more low wind speed sites, 4. proposed innovation can be applied to upgrade existing wind turbine machines that can produce more power.

Wind energy is environmentally safe and is an inexhaustible source. The proposed wind turbine system is on the order of 80% more efficient than its known counterparts and is operable in low wind speed regions. Thus, more geographic regions can be serviced by this wind energy project. The ownership cost of these units is expected to be about half that of comparable units presently on the market.

It should be understood that the foregoing description is only illustrative of the invention. Various alternatives and modifications can be devised by those skilled in the art without departing from the invention. Accordingly, the present invention is intended to embrace all such alternatives, modifications and variances, which fall within the scope of the appended claims.

I claim:

1. A method of designing and manufacturing hybrid wind turbine apparatus comprising:

an assembly of tandemly mounted dual alternators directly driven by counter rotating rotors having plurality of blades ranging from one, two or three blades per rotor, wherein each blade tip is fitted with a micro thruster powered by natural gas or liquid fuel;

a stationary armature shell having plurality of armature windings;

an inner rotating magnet drum having plurality of magnetic field pole pairs fixed on drum periphery at plurality of equally spaced locations, thereby generating electrical power as the upwind rotor and downwind rotor rotate in opposite directions to each.

2. Hybrid wind turbine apparatus as set forth in claim 1 including:

an upright mast; and a yaw bearing on the upright mast underlying the hub assembly for rotatably supporting the hub assembly enabling it to be selectively positioned in azimuth so that the first set of rotor blades are relatively closer to the wind-induced air flow, or upwind, and the second set of rotor blades are relatively farther from the wind-induced air flow, or leeward or downwind.

3. Hybrid wind turbine apparatus as set forth in claim 1 wherein each of the rotor blades extends from the shaft to a tip end and has a radial passage extending from an inlet at the inner peripheral surface of the shaft;

wherein the shaft is hollow and defines an axially extending duct; and including:

a windward inlet nozzle for receiving wind-induced air, a centrifugal fan in a heat exchanger for circulating ambient air around an armature for cooling means and redirecting hot air through an axially extending hallow shaft to the radial passage in each of the rotor blades.

4. Hybrid wind turbine apparatus as set forth in claim 3 wherein each of the rotor blade tips is fitted with tangentially directed micro thruster powered by natural gas or any suitable liquid fuel.

5. Hybrid wind turbine apparatus as set forth in claim 3 wherein a rotary fluid coupler connects a stationary fuel line to a rotating fuel conduit firmly fixed to said rotating hallow shaft.

6. Hybrid wind turbine apparatus as set forth in claim 4 wherein each of the rotor blade tips is fitted with a solar cell powered battery source and a sensor to sense incoming fuel and ignite the fuel mixture in the combustion chamber of said thruster.

7. A method of generating power comprising the steps of:

(a) mounting two alternators in tandem on a self aligning base on top of a mast;

(b) directly mounting a first rotor on the shaft of the upwind alternator;

(c) directly mounting a second rotor on the shaft of the downwind alternator;

(d) positioning the blades of first and second set of rotors so that wind-induced airflow causes the first set of blades to rotate in a direction opposite to the second set of blades.

8. A method of generating power as set forth in claim 7 including the steps of:

(e) providing plurality of armature windings on the outer shell;

(f) providing a plurality of magnetic field pole pairs on the inner drum at plurality of circumferentially spaced locations;

(g) separating each adjacent pair of armature windings with a dielectric spacer thereby generating electrical power as the plurality of magnetic field poles rotate in relation to armature windings.

9. A method of generating power as set forth in claim 7 further including the steps of:

(h) providing each of the rotor blades with a radial passage extending from an inlet at the inner peripheral surface of the shaft to a tangentially directed outlet at the tip end;

(i) providing an annular passage of uniform dimension between the armature shell and heat exchanger enclosure;

(j) providing an axially extending duct through the shaft;

(k) providing a centrifugal fan to circulate ambient air around armature for cooling means and permitting the air to flow through the annular passage and redirecting the air flow through the inlet to the radial passage of each of the rotor blades;

(l) providing micro thrusters at the tip of each blade; and (m) providing fuel source to the thruster during low wind periods.

10. A method of generating power as set forth in claim 7 including the step of:

drawing off the electrical power from the hub assembly to a distant receiver.

\* \* \* \* \*